United States Patent
Marupaduga

(10) Patent No.: US 11,641,641 B2
(45) Date of Patent: May 2, 2023

(54) PRIMARY COMPONENT CARRIER CONTROL IN A WIRELESS ACCESS NODE THAT USES MULTIPLE RADIO FREQUENCY BANDS

(71) Applicant: T-Mobile Innovations LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/551,516

(22) Filed: Dec. 15, 2021

(65) Prior Publication Data
US 2022/0110126 A1 Apr. 7, 2022

Related U.S. Application Data

(63) Continuation of application No. 16/707,558, filed on Dec. 9, 2019, now Pat. No. 11,265,878.

(51) Int. Cl.
| | |
|---|---|
| *H04W 72/04* | (2009.01) |
| *H04W 24/10* | (2009.01) |
| *H04B 17/318* | (2015.01) |
| *H04W 84/04* | (2009.01) |
| *H04B 7/0413* | (2017.01) |
| *H04W 16/10* | (2009.01) |
| *H04L 25/03* | (2006.01) |
| *H04W 72/0453* | (2023.01) |

(52) U.S. Cl.
CPC ...... *H04W 72/0453* (2013.01); *H04B 17/318* (2015.01); *H04W 24/10* (2013.01); *H04B 7/0413* (2013.01); *H04L 2025/03426* (2013.01); *H04W 16/10* (2013.01); *H04W 84/042* (2013.01)

(58) Field of Classification Search
CPC . H04W 72/0453; H04W 24/10; H04W 16/10; H04W 84/042; H04W 24/02; H04W 72/085; H04B 17/318; H04B 7/0413; H04L 2025/03426; H04L 5/0023; H04L 5/001

See application file for complete search history.

(56) References Cited

U.S. PATENT DOCUMENTS

| | | |
|---|---|---|
| 7,978,674 B1 | 7/2011 | Oroskar et al. |
| 8,583,047 B2 | 11/2013 | Zhang et al. |
| 8,917,593 B2 | 12/2014 | Damnjanovic et al. |
| 8,983,516 B2 | 3/2015 | Wang |
| 9,054,835 B2 | 6/2015 | Kwon et al. |
| 9,072,104 B2 | 6/2015 | Maeda et al. |

(Continued)

*Primary Examiner* — Brian T O Connor

(57) ABSTRACT

A wireless access node serves a wireless User Equipment (UE) over radio frequency bands that comprise layers. The layers comprise parallel signals that share individual resource blocks in the radio frequency bands. In the wireless access node, radio circuitry wirelessly receives information from the wireless UE that indicates received signal strengths for the radio frequency bands. In the wireless access node, processing circuitry determines layer amounts for the radio frequency bands. The processing circuitry selects one of the radio frequency bands that has an adequate one of the received signal strengths and a higher one of the layer amounts. The radio circuitry wirelessly exchanges user data with the wireless UE over the selected one of the radio frequency bands to serve the wireless UE.

20 Claims, 10 Drawing Sheets

(56) References Cited

U.S. PATENT DOCUMENTS

| | | |
|---|---|---|
| 9,240,850 B2 | 1/2016 | Du et al. |
| 9,277,470 B2 | 3/2016 | Laroia et al. |
| 9,474,071 B2 | 10/2016 | Dahlen |
| 9,930,677 B2 | 3/2018 | Choudhury et al. |
| 10,136,417 B2 | 11/2018 | Gauvreau et al. |
| 10,298,774 B2 | 5/2019 | Russell et al. |
| 10,368,253 B2 | 7/2019 | Lei et al. |
| 10,757,576 B2 | 8/2020 | Ashraf |
| 10,863,411 B2 | 12/2020 | Karimli et al. |
| 10,917,147 B2 | 2/2021 | Duxbury et al. |
| 11,115,989 B1 * | 9/2021 | Marupaduga ......... H04L 5/0058 |
| 11,265,878 B1 * | 3/2022 | Marupaduga ......... H04W 24/10 |
| 2010/0067469 A1 | 3/2010 | Gaal et al. |
| 2014/0162669 A1 | 6/2014 | Dahlen |
| 2019/0037417 A1 | 1/2019 | Lei et al. |
| 2020/0145061 A1 | 5/2020 | Black et al. |
| 2020/0267586 A1 | 8/2020 | Hwang et al. |
| 2020/0314934 A1 | 10/2020 | Raghavan et al. |
| 2021/0006997 A1 | 1/2021 | Jin et al. |
| 2021/0119741 A1 * | 4/2021 | Zhou ................ H04W 72/1278 |

* cited by examiner

PRIMARY COMPONENT CARRIER CONTROL IN A WIRELESS ACCESS NODE THAT USES MULTIPLE RADIO FREQUENCY BANDS

RELATED CASES

This United States patent application is a continuation of U.S. patent application Ser. No. 16/707,558 that was filed on Dec. 9, 2019 and is entitled "PRIMARY COMPONENT CARRIER CONTROL IN A WIRELESS ACCESS NODE THAT USES MULTIPLE RADIO FREQUENCY BANDS." U.S. patent application Ser. No. 16/707,558 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless access nodes use radio frequency bands to exchange the wireless signals over the air with the wireless user devices. An exemplary radio frequency band might be centered at one gigahertz and be 100 megahertz wide. The radio frequency bands are often licensed from the Federal Communication Commission (FCC). The radio frequency bands are usually subdivided into frequency channels. Some wireless user devices can use multiple radio frequency bands at the same time. When using multiple frequency bands simultaneously, a bi-directional wireless link called a Primary Component Carrier (PCC) is established over one of the frequency bands. Additional Secondary Component Carriers (SCCs) are then established over the frequency bands. The wireless user device uses the PCC to signal the wireless communication network, transfer uplink data, and receive downlink data. The wireless user device uses the SCCs to receive additional downlink data. In some scenarios, an LTE eNodeB serves the PCC to the wireless user device, and multiple 5GNR gNodeBs serve the SCCs to the wireless user device. Thus, the wireless user device uses the LTE PCC to establish multiple 5GNR downlink SCCs. For the PCC, the LTE eNodeB typically selects the radio frequency that has the strongest signal at the wireless user device.

Unfortunately, the wireless access nodes do not efficiently serve the wireless UEs over the PCCs and the SCCs. Moreover, the wireless access nodes do not effectively select radio frequencies for the PCCs.

Technical Overview

A wireless access node serves a wireless User Equipment (UE) over radio frequency bands that comprise layers. The layers comprise parallel signals that share individual resource blocks in the radio frequency bands. In the wireless access node, radio circuitry wirelessly receives information from the wireless UE that indicates received signal strengths for the radio frequency bands. In the wireless access node, processing circuitry determines layer amounts for the radio frequency bands. The processing circuitry selects one of the radio frequency bands that has an adequate one of the received signal strengths and a higher one of the layer amounts. The radio circuitry wirelessly exchanges user data with the wireless UE over the selected one of the radio frequency bands to serve the wireless UE.

DETAILED DESCRIPTION

Figure 1:
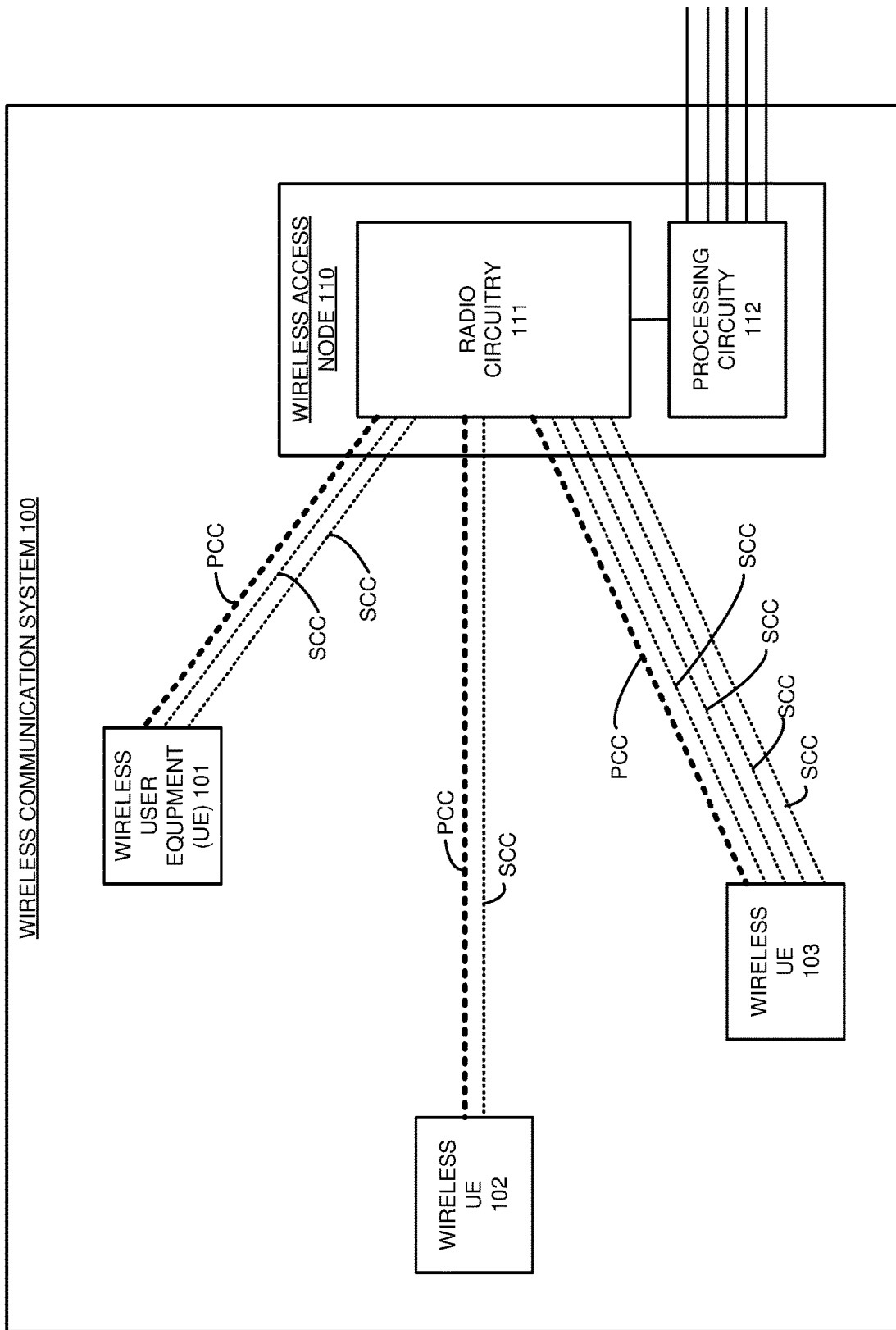
FIG. 1 illustrates a wireless communication system comprising a wireless access node to serve wireless UEs over Primary Component Carriers (PCCs) and Secondary Component Carriers (SCCs).

FIG. 1 illustrates wireless communication system 100 comprising wireless access node 110 to serve wireless User Equipment (UEs) 101-103 over Primary Component Carriers (PCCs) and Secondary Component Carriers (SCCs). Wireless access node 110 comprises radio circuitry 111 and processing circuitry 112. UEs 101-103 might be phones, computers, robots, vehicles, or some other data appliances with wireless communication circuitry. Radio circuitry 111 is wirelessly linked to UEs 101-103 over the PCCs and SCCs. Radio circuitry 111 and processing circuitry 112 are coupled over data links. Processing circuitry 112 is linked to other wireless access nodes and network elements over backhaul links.

The PCCs transfer uplink and downlink data between wireless UEs 101-103 and wireless access node 110. The SCCs transfer downlink data from wireless access node 110 to wireless UEs 101-103. The PCCs and SCCs use Fifth Generation New Radio (5GNR), Long Term Evolution (LTE), Low-Power Wide Area Network (LP-WAN), or some other wireless communication protocol. The PCCs and SCCs use frequencies in the low-band, mid-band, high-band, or some other part of the electromagnetic spectrum. The PCCs and SCCs use radio frequency bands that may comprise radio frequency channels in licensed Federal Communication Commission (FCC) spectrum. The backhaul links use Institute of Electrical and Electronic Engineers (IEEE) 802.3 (Ethernet), Time Division Multiplex (TDM), Data Over Cable System Interface Specification (DOCSIS), Internet Protocol (IP), 5GNR, IEEE 802.11 (WIFI), LTE, or some other data communication protocol.

In wireless access node 110, radio circuitry 111 comprises antennas, filters, amplifiers, analog-to-digital interfaces, microprocessors, memory, software, transceivers, bus circuitry, and the like. Processing circuitry 112 comprises microprocessors, memory, software, transceivers, and bus circuitry, and the like. The microprocessors comprise Digital Signal Processors (DSP), Central Processing Units (CPU), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems and network applications. In some examples, processing circuitry 112 comprises a Radio Resource Control (RRC) in a Long Term Evolution (LTE) evolved NodeB. In some examples, wireless access node 110 comprises an Evolved Universal Terrestrial Radio Access New Radio Dual Connectivity (EN-DC) access node.

In operation, UE 101 detects various radio frequency bands and their received signal strengths. Each frequency band serves its own sector, and UE 101 is located in multiple overlapping sectors. Radio circuitry 111 wirelessly receives a report from wireless UE 101 indicating the detected radio frequency bands and their received signal strengths. Radio circuitry 111 transfers the report to processing circuitry 112. Processing circuitry 112 processes the report to identify the radio frequency bands that have adequate received signal strength. For example, processing circuitry 112 may compare the received signal strengths to a signal strength threshold to determine "adequate" signal strength.

Processing circuitry 112 determines Multiple Input Multiple Output (MIMO) layers for the radio frequency bands. MIMO layers represent parallel radio signals that use the same time and frequency resources but that use beamforming to isolate the different signals. The MIMO layers for a radio frequency band indicate the maximum number of different isolated signals that are supported by the frequency band for all UEs in the sector. Processing circuitry 112 selects one of the identified radio frequency bands that has adequate received signal strength and that also has a larger amount of MIMO layers. In this context, a "larger" amount of MIMO layers is an amount that is more than the average of the MIMO layers for all of the frequency bands.

Radio circuitry 111 wirelessly exchanges user data and network signaling with wireless UE 101 over the selected frequency band to serve the PCC to UE 101. Radio circuitry 111 wirelessly transfers additional user data to UE 101 over some of the radio frequency bands to serve the SCCs to UE 101. Radio circuitry 111 and processing circuitry 112 exchange the user data, and processing circuitry 112 exchanges the user data with other wireless access nodes and/or network elements.

In some examples, processing circuitry 112 also determines UE centrality angles for the radio frequency bands. A UE centrality angle indicates the angle between the mid-sector azimuth and the UE azimuth. The centrality angle indicates UE proximity to the middle azimuth of the sector. Processing circuitry 112 selects the identified radio frequency bands having a larger amount of MIMO layers and a smaller UE centrality angle. In this context, a "smaller" UE centrality angle is an angle that is less than the average of the UE centrality angles for all of the frequency bands.

In some examples, processing circuitry 112 also determines available sector proportions for the radio frequency bands. An available sector proportion indicates the percentage of the sector between UE 101 and the sector edge. The available sector proportion indicates UE proximity to the front of the sector irrespective of sector size. Processing circuitry 112 selects the identified radio frequency bands having a larger amount of MIMO layers, a smaller UE centrality angle, and a larger available sector proportion. In this context, a "larger" available sector proportion is a proportion that is more than the average of the available sector proportion for all of the frequency bands.

In some examples, processing circuitry 112 determines electrical down-tilt angles for the individual radio frequency bands. An electrical down-tilt angle is the result of beamforming by radio circuitry 111 to direct (tilt) radio transmissions down toward the ground. Increasing the electrical down-tilt shrinks the radio coverage of a sector and decreasing the electrical down-tilt increases the radio coverage of the sector. The electrical down-tilt angles may comprise Massive-MIMO (M-MIMO) beamforming angles. Processing circuitry 112 selects one of the identified radio frequency bands that has adequate received signal strength and that also has a larger amount of MIMO layers, a smaller UE centrality angle, a larger available sector proportion, and a smaller one of the electrical down-tilt angles. In this context, a "smaller" electrical down-tilt angle is an angle that is less than the average of the down-tilt angles for all of the frequency bands.

In some examples, processing circuitry 112 scores the received signal strengths, the MIMO layers, the UE centrality angles, the available sector proportions and/or the electrical down-tilt angles. Processing circuitry 112 aggregates the scores for an individual radio frequency band into a common score for that frequency band. Processing circuitry 112 selects the identified radio frequency band that has the best common score. For a given radio frequency band, the received signal strength, amount of MIMO layers, UE centrality angle, available sector proportion, and electrical down-tilt angle may each be normalized with a scaling factor. The normalized values are then summed to obtain the score for the radio frequency band.

Wireless access node 110 selects the radio frequency band for the PCC for UE 101 based on the received signal strengths and one or more of the amounts of MIMO layers, UE centrality angles, available sector proportions, and electrical down-tilt angles for UE 101. Wireless access node 110 serves UEs 102-103 in a similar manner. Thus, wireless access node 110 selects the radio frequency band for the PCC for UE 102 based on received signal strengths and one or more of the amounts of MIMO layers, UE centrality angles, available sector proportions, and electrical down-tilt angles for UE 102. Wireless access node 110 selects the radio frequency band for the PCC for UE 103 based on received signal strengths and one or more of the amounts of MIMO layers, UE centrality angles, available sector proportions, and electrical down-tilt angles for UE 103.

Advantageously, wireless access node 110 effectively serves wireless UEs 101-103 over the PCCs and SCCs. Moreover, wireless access node 110 effectively selects the radio frequency bands for the PCCs.

Figure 2:
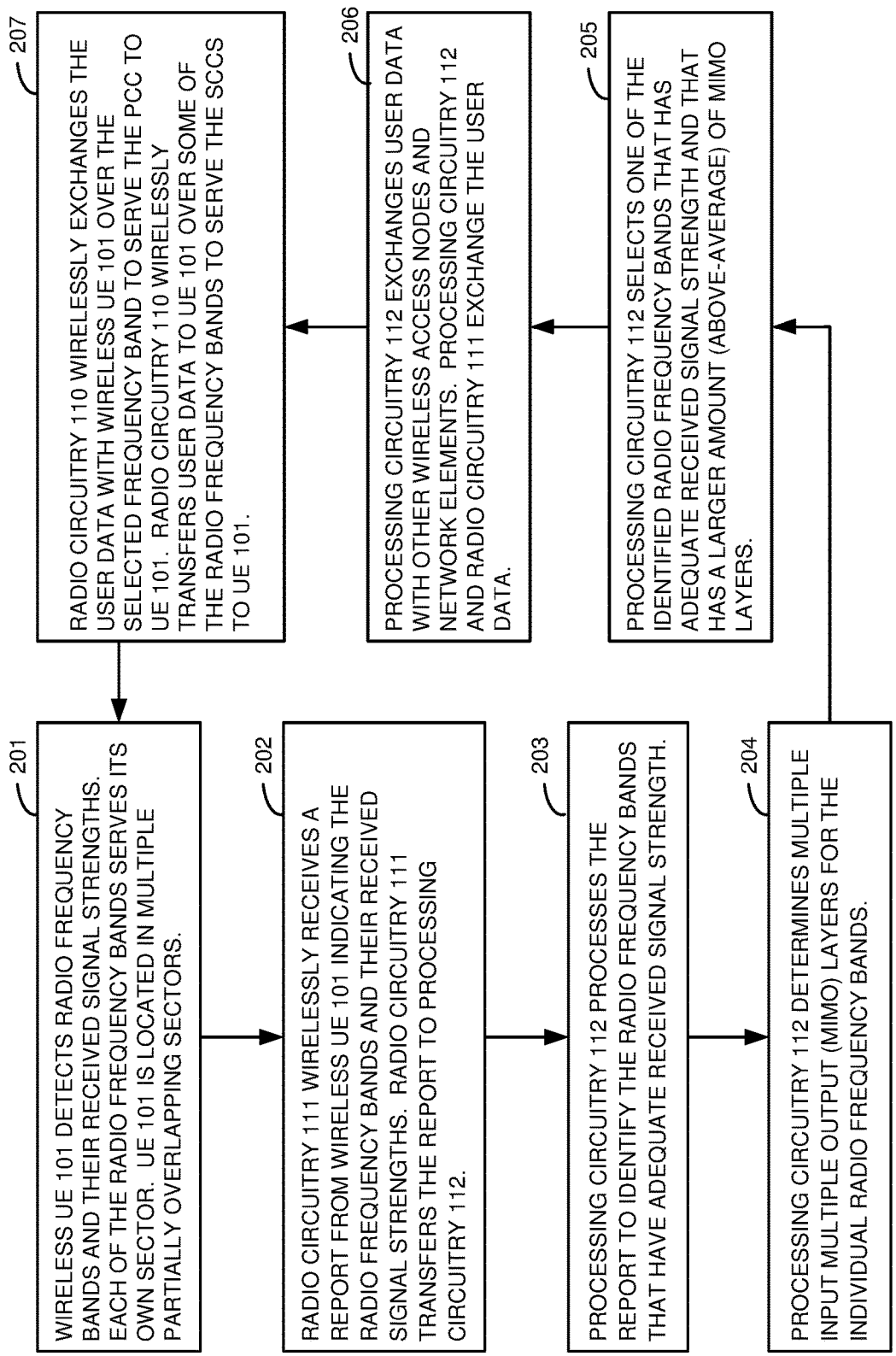
FIG. 2 illustrates the operation of the wireless access node to serve the wireless UEs over the PCCs and SCCs.

FIG. 2 illustrates the operation of wireless access node 110 to serve wireless UE 101 over the PCC and SCCs. UE 101 detects radio frequency bands and their received signal strengths (201). Each of the radio frequency bands serves its own sector, and UE 101 is located in multiple overlapping sectors. Radio circuitry 111 wirelessly receives a report from wireless UE 101 indicating the radio frequency bands and their received signal strengths (202). Radio circuitry 111 transfers the report to processing circuitry 112.

Processing circuitry 112 processes the report to identify the radio frequency bands that have adequate received signal strength (203). Processing circuitry 112 determines Multiple Input Multiple Output (MIMO) layers for the individual radio frequency bands. In a given sector, radio circuitry 111 can transmit different signals over multiple antennas to the UEs in the sector (including UEs 101-103) using the same time and frequency. The UEs use beamforming techniques to isolate the different signals that share the same time and frequency. The amount of MIMO layers for a radio frequency band in a sector is the number of different signals (for all UEs) that can share the same time and frequency and still be isolated. Processing circuitry 112 selects the identified radio frequency band that has both adequate received signal strength and a larger or above average amount of MIMO layers (204).

Processing circuitry 112 exchanges user data with other wireless access nodes and network elements. Processing circuitry 112 and radio circuitry 111 exchange the user data. Radio circuitry 111 wirelessly exchanges the user data with wireless UE 101 over the selected frequency band to serve the PCC to UE 101. Radio circuitry 111 wirelessly transfers user data to UE 101 over some of the radio frequency bands to serve the SCCs to UE 101.

Figure 3:
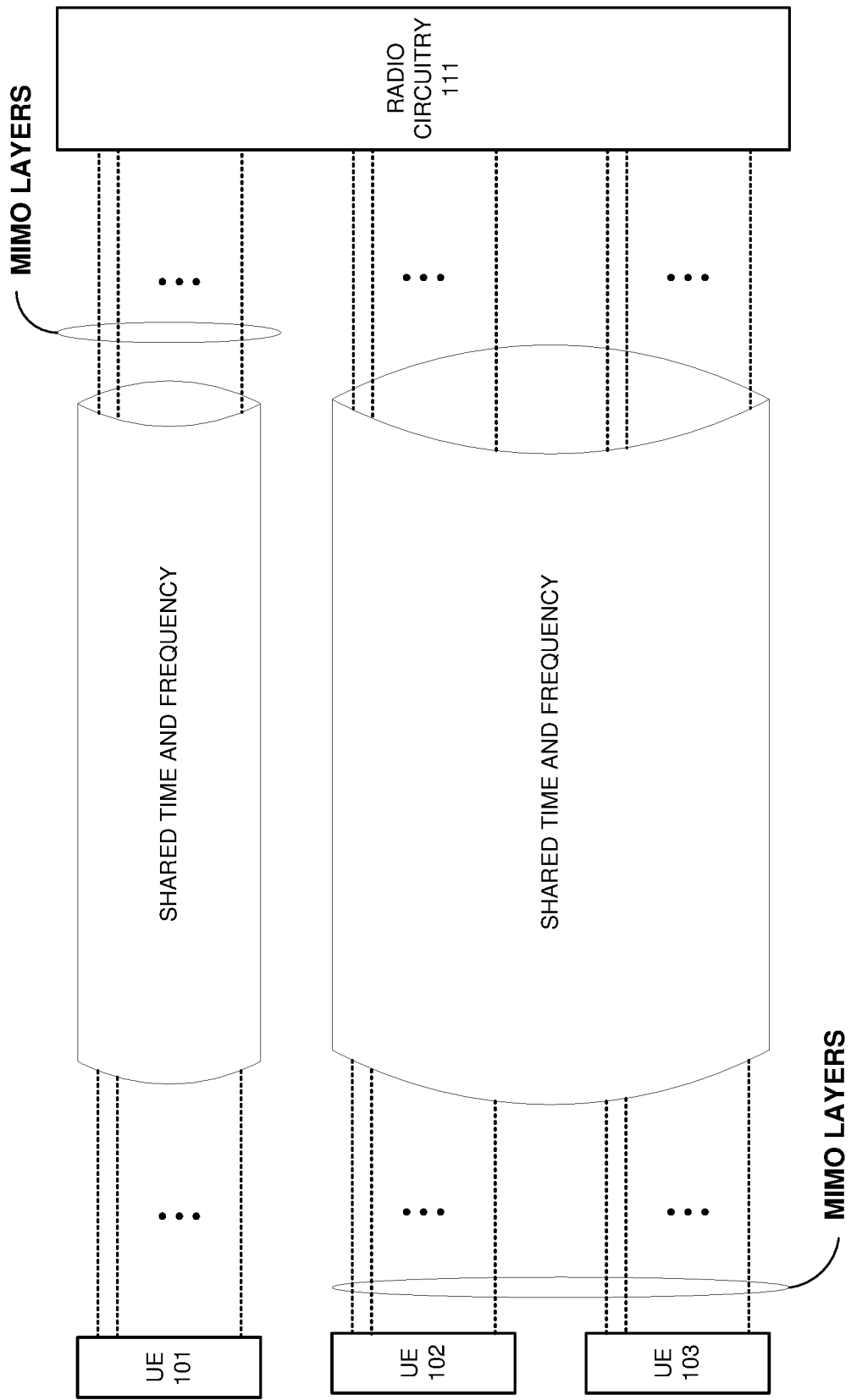
FIG. 3 illustrates Multiple Input Multiple Output (MIMO) layers for the frequency band in the sector of the wireless communication system.

FIG. 3 illustrates Multiple Input Multiple Output (MIMO) layers for a frequency band in a sector of wireless communication system 100. Radio circuitry 111 uses the radio frequency band to serve the sector. The MIMO layers for UE 101 comprise the number of isolated radio signals between UE 101 and radio circuitry 111 that use the same time and frequency—like the same resource block. The MIMO layers for UEs 102-103 comprise the number of isolated radio signals between UEs 102-103 and radio circuitry 111 that use the same time and frequency. The MIMO layers are formed by using multiple antennas and beamforming to isolate the different radio signals based on their different antenna signatures. For the specific radio frequency band and sector, the amount of MIMO layers comprises the total number of MIMO layers that are available for all UEs in the sector. When the signal strength for the specific radio frequency band is adequate for UE 101 and when the amount of MIMO layers for the radio frequency band is above-average, wireless access node 110 may select the specific radio frequency band for the PCC for UE 101. UEs 102-103 could be served in a similar manner.

Figure 4:
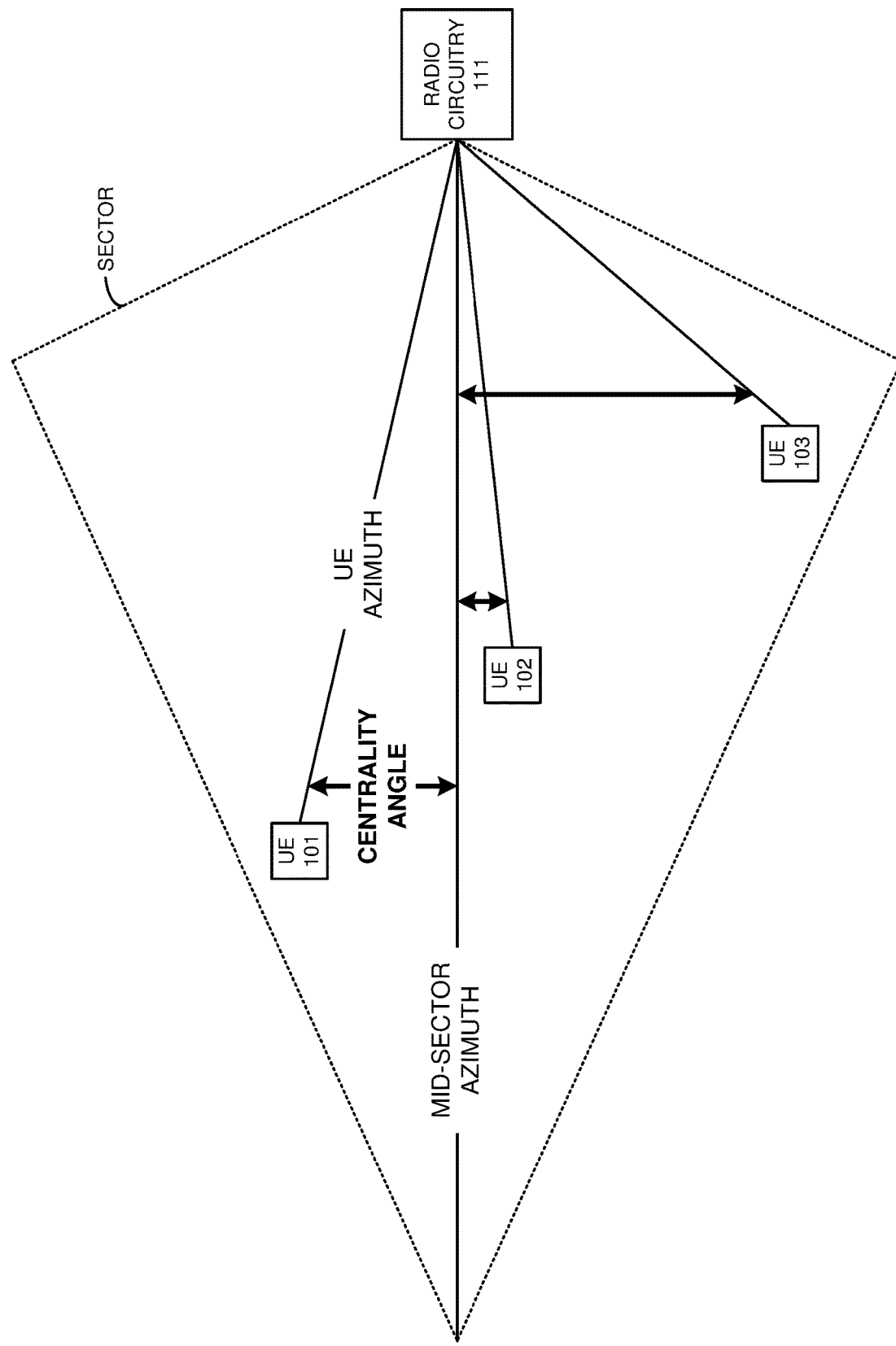
FIG. 4 illustrates UE centrality angles for the frequency band in the sector of the wireless communication system.

FIG. 4 illustrates a UE centrality angle for a radio frequency band in a sector of wireless communication system 100. Radio circuitry 111 uses the radio frequency band to serve the sector. The sector has a "pizza slice" shape, but other sector configurations could be used. For the specific radio frequency band and sector, the centrality angle is between a mid-sector azimuth and a UE azimuth. The centrality angle is formed by the UE location in the sector as viewed from above. When the signal strength for the specific radio frequency band is adequate for UE 101 and when the centrality angle for the radio frequency band is below-average, wireless access node 110 may select the specific radio frequency band for the PCC for UE 101. UEs 102-103 could be served in a similar manner.

Figure 5:
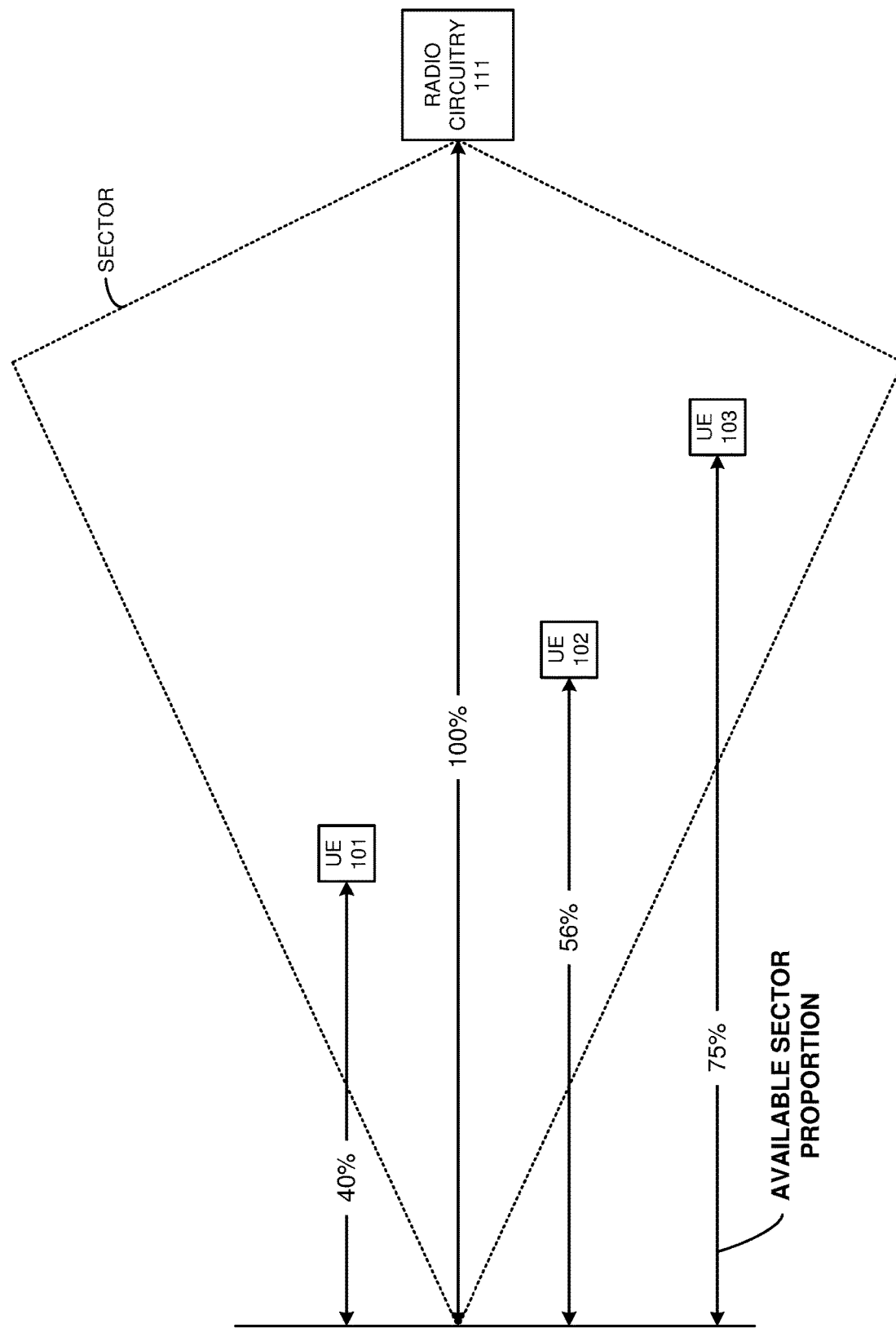
FIG. 5 illustrates available sector proportions for the frequency band in the sector of the wireless communication system.

FIG. 5 illustrates available sector proportions for the radio frequency band in the sector of wireless communication system 100. Radio circuitry 111 uses the radio frequency band to serve the sector. The sector has the pizza slice shape, but other sector configurations could be used. For the specific radio frequency band and sector, the available sector portion for UE 101 is a ratio of a distance and a length. The distance is between UE 101 and the sector edge, and the length is the total distance of the sector. The available sector portion is formed by the UE location in the sector as viewed from above. The available sector portion shrinks as UE 101 approaches the far edge of the sector. When the signal strength for the specific radio frequency band is adequate for UE 101 and when the available sector portion for the radio frequency band is above-average, wireless access node 110 may select the specific radio frequency band for the PCC for UE 101. UEs 102-103 could be served in a similar manner.

Figure 6:
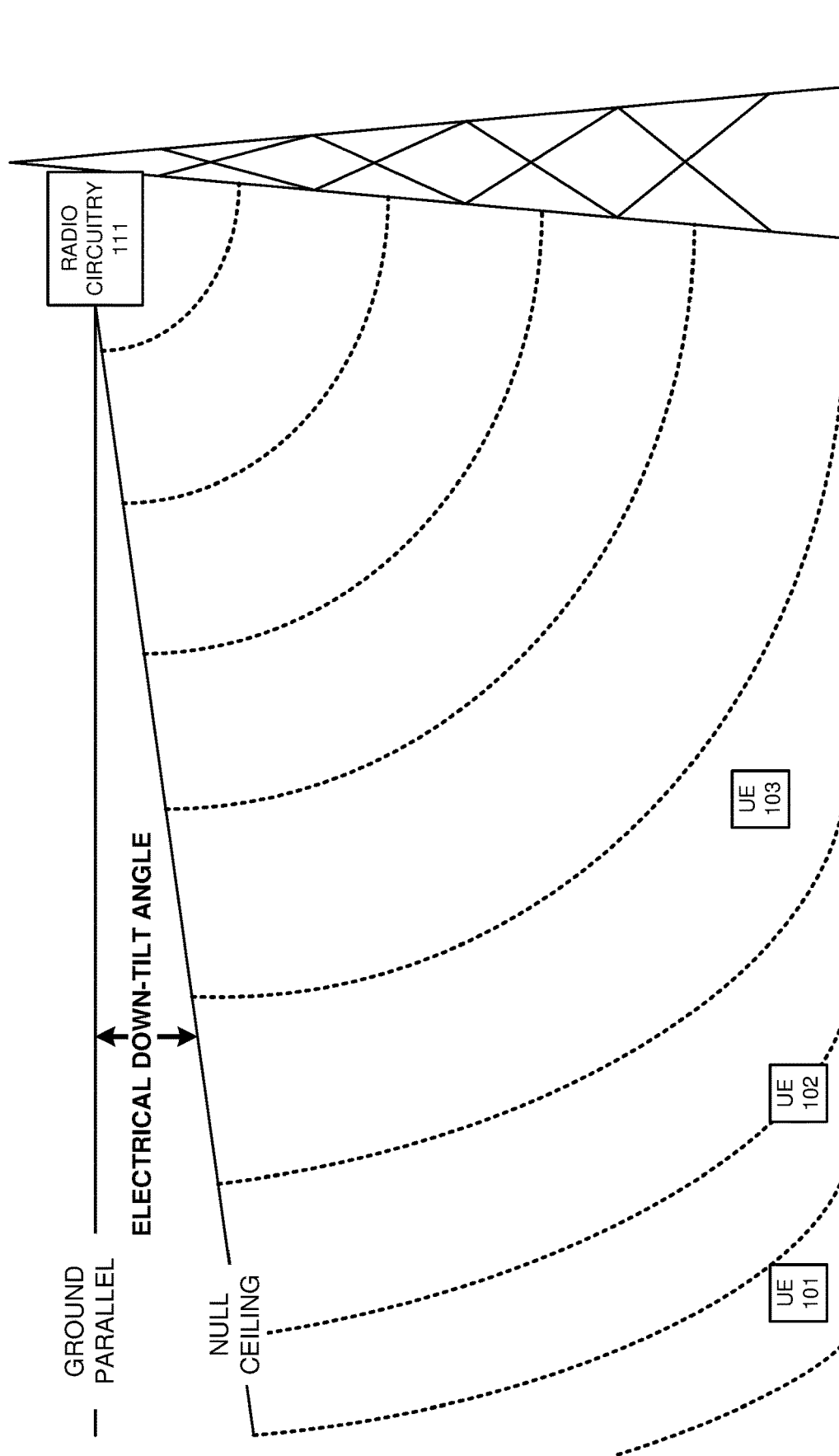
FIG. 6 illustrates an electrical down-tilt angle for a frequency band in a sector of the wireless communication system.

FIG. 6 illustrates an electrical down-tilt angle for the radio frequency band in the sector of wireless communication system 100. For illustrative purposes, a portion of radio circuitry 111 is shown mounted on a tower but other mounting locations could be used. Other portions of radio circuitry 111 are located elsewhere and are not shown on FIG. 3. The portion of radio circuitry 111 that is shown on FIG. 3 uses a specific radio frequency band to serve its sector. For the specific radio frequency band and sector, the electrical down-tilt angle is between a ground parallel and a null ceiling. The null ceiling is formed by beamforming transmit signals to null the signal energy above the ceiling. When the signal strength for the specific radio frequency band is adequate for UE 101 and when the electrical down-tilt for the radio frequency band is below-average, wireless access node 110 selects the specific radio frequency band for the PCC for UE 101. UEs 102-103 could be served in a similar manner.

Figure 7:
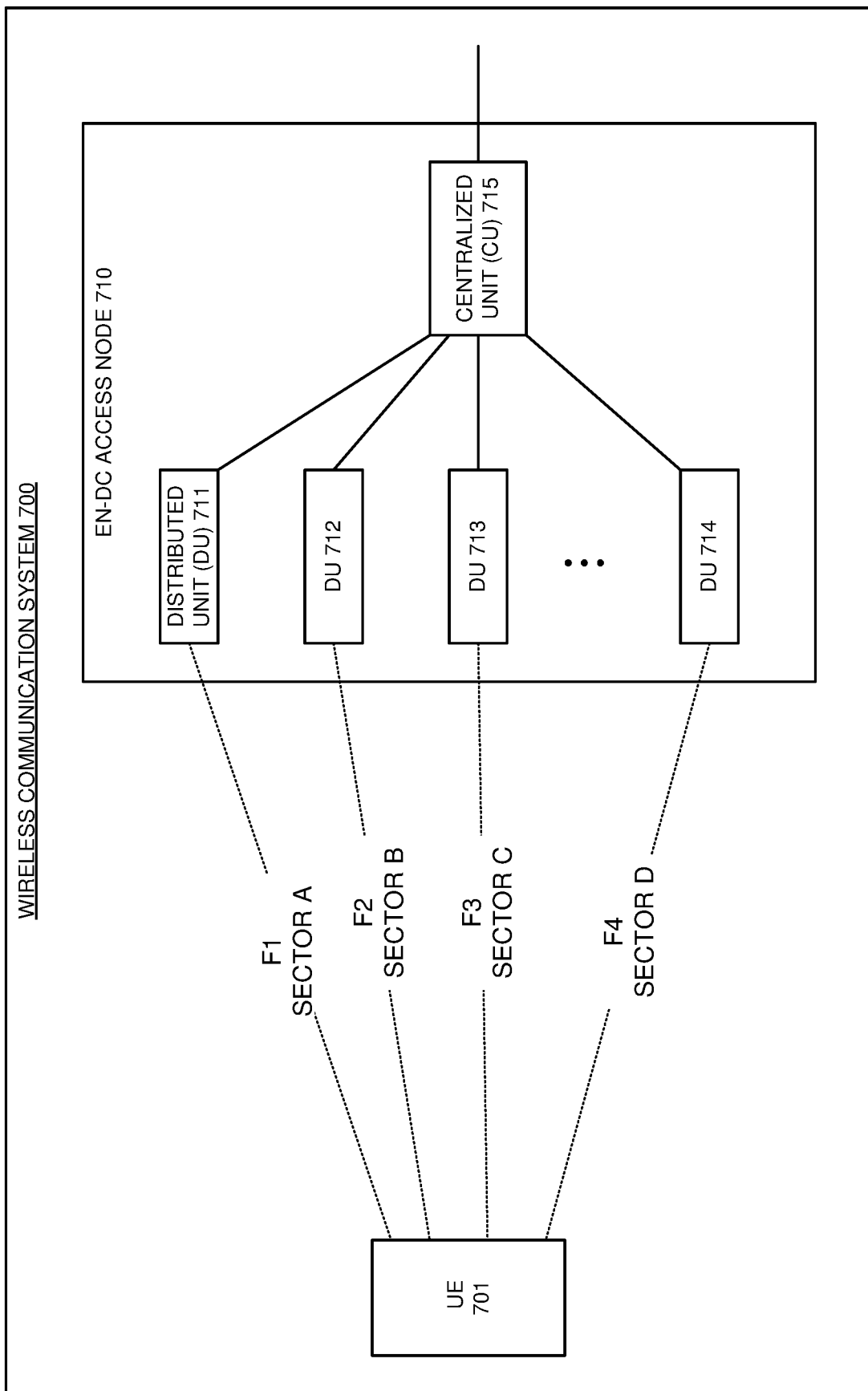
FIG. 7 illustrates a wireless communication system comprising an Evolved Universal Terrestrial Radio Access New Radio Dual Connectivity (EN-DC) access node to serve wireless UEs over PCCs and SCCs.

FIG. 7 illustrates wireless communication system 700 comprising an Evolved Universal Terrestrial Radio Access New Radio Dual Connectivity (EN-DC) access node 710 to serve wireless UE 701 over a Primary Component Carrier (PCC) and Secondary Component Carriers (SCCs). Wireless communication system 700 is an example of communication system 100, although system 100 may differ. EN-DC access node 710 comprises Distributed Units (DUs) 711-714 and Centralized Unit (CU) 715. DU 711 uses a first radio frequency band (F1) to serve a sector "A". DU 712 uses a second radio frequency band (F2) to serve a sector "B". DU 713 uses a third radio frequency band (F3) to serve a sector "C". DU 714 uses a fourth radio frequency band (F4) to serve a sector "D". Sectors A-D partially overlap, and UE 701 is present in the overlapping portions sectors A-D.

UE 701 detects F1-F4 and their received signal strengths. One of DUs 711-714 wirelessly receives a report from wireless UE 701 indicating F1-F4 and received signal strengths. The DU transfers the report to CU 715. CU 715 processes the report to identify which of F1-F4 have received signal strength above a threshold. For example, CU 715 may determine that F4 does not have adequate received signal strength at UE 701.

CU 715 may determine MIMO layers for F1-F4 and sectors A-D. CU 715 may then select one of F1-F4 that has adequate received signal strength and that also has a larger or above-average amount of MIMO layers. For example, F1-F3 may have adequate received signal strength, and CU 715 may select F3 over F1-F2 because F3 has the highest amount of MIMO layers.

CU 715 may determine UE centrality angles for F1-F4 and sectors A-D. CU 715 may then select one of F1-F4 that has adequate received signal strength and that also has a smaller or below-average UE centrality angle. For example, F1-F3 may have adequate received signal strength, and CU 715 may select F3 over F1-F2 because F3 has the lowest UE centrality angle.

CU 715 may determine available sector proportions for F1-F4 and sectors A-D. CU 715 may then select one of F1-F4 that has adequate received signal strength and that also has a larger or above-average available sector proportion. For example, F1-F3 may have adequate received signal strength, and CU 715 may select F3 over F1-F2 because F3 has the largest available sector proportion for UE 701.

CU 715 may determine electrical down-tilt angles for F1-F4 and sectors A-D. CU 715 may then select one of F1-F4 that has adequate received signal strength and that also has a smaller or below-average electrical down-tilt angle. For example, F1-F3 may have adequate received signal strength, and CU 715 may select F3 over F1-F2 because F3 has the lowest electrical down-tilt angle.

When DU 711, F1, and sector A are selected for UE 701, DU 711 wirelessly exchanges user data and network signaling with UE 701 over F1 to serve the PCC. When DU 712, F2, and sector B are selected for UE 701, DU 712 wirelessly exchanges user data and network signaling with UE 701 over F2 to serve the PCC. When DU 713, F3, and sector C are selected for UE 701, DU 713 wirelessly exchanges user data and network signaling with UE 701 over F3 to serve the PCC. When DU 714, F4, and sector D are selected for UE 701, DU 714 wirelessly exchanges user data and network signaling with UE 701 over F4 to serve the PCC. DUs 711-714 wirelessly transfer additional user data to UE 701 over F1-F4 to serve SCCs. DUs 711-714 and CU 715 exchange the user data. CU 715 exchanges the user data with other CUs and/or network elements.

CU 715 may process a combination of the above factors (MIMO layer, UE centrality angle, available sector proportion, and electrical down-tilt angle) to select one of F1-F4 for the PCC for UE 701. CU 715 may score F1-F4 by normalizing and summing the factors to select the one of F1-F4 that has adequate received signal strength and the best score. CU 715 may score F1-F4 by normalizing and summing received signal strength along with at least some of the other factors to select one of F1-F4 that has and the best score.

Figure 8:
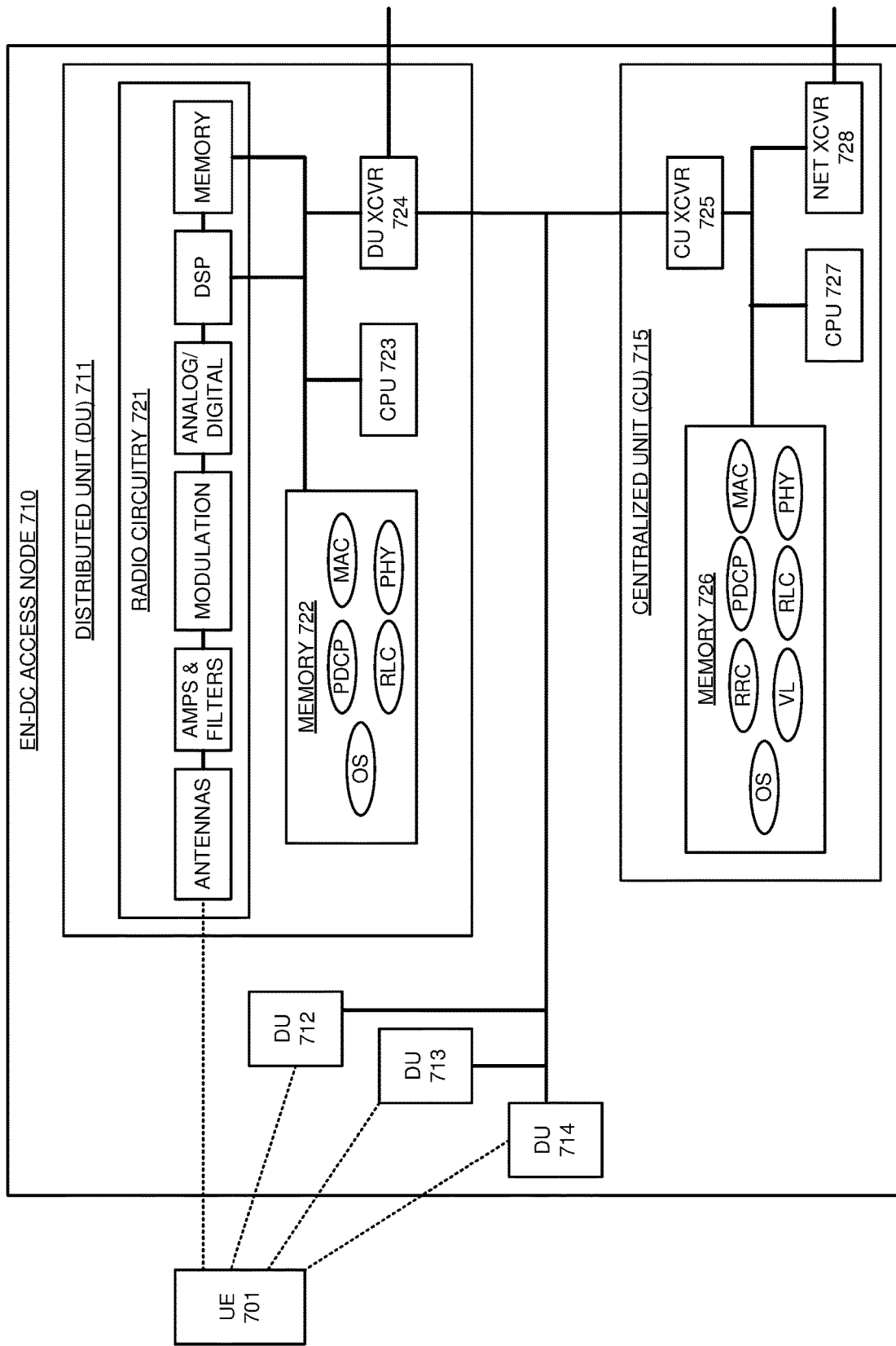
FIG. 8 illustrates the EN-DC access node to serve the wireless UEs over PCCs and SCCs.

FIG. 8 illustrates EN-DC access node 710 to serve wireless UE 701 over the PCCs and the SCCs. EN-DC access node 710 is an example of wireless access node 110, although access node 110 may differ. EN-DC access node 710 comprises Distributed Units (DUs) 711-714 and Centralized Unit (CU) 715. DU 711 comprises radio circuitry 721, memory 722, Central Processing Units (CPU) 723, and DU XCVR 724 that are coupled over bus circuitry. Radio circuitry 721 comprises antennas, amplifiers (AMPS), filters, modulation, analog-to-digital interfaces, Digital Signal Processors (DSP), and memory that are coupled over bus circuitry. DUs 712-714 are similar to DU 711 but use different frequency bands. CU circuitry 715 comprises CU XCVR 725, memory 726, CPU 727, and network XCVR 728 that are coupled over bus circuitry.

UE 701 is wirelessly coupled to the antennas in DUs 711-714. DU XCVR 724 is coupled to CU XCVR 725 over fronthaul links. Network XCVR 728 is coupled to other CUs and network elements over backhaul network links. In DU 711, memory 722 stores operating system (OS), Physical Layer (PHY), Media Access Control (MAC), Radio Link Control (RLC), and Packet Data Convergence Protocol (PDCP). In CU 715, memory 726 stores an operating system, virtual layer, PHY, MAC, RLC, PDCP, Radio Resource Control (RRC), and Service Data Adaptation Protocol (SDAP). The virtual layer comprises hypervisor modules, virtual switches, virtual CPUs, and/or the like. CPU 727 in CU 715 executes some of the network applications (PHY, MAC, RLC, PDCP, RRC, SDAP) to drive the exchange of user data and network signaling between external systems and DUs 711-714. The CPUs in DUs 711-714 execute some or all of the network applications (PHY, MAC, RLC, PDCP) to drive the transfer of user data and network signaling between CU 715 and UE 701. The functionality split of the network applications (PHY, MAC, RLC, PDCP) between DUs 711-714 and CU 715 may vary.

UE 701 and the RRC in CU 715 exchange Non-Access Stratum (NAS) signaling and RRC signaling over one of DUs 711-714. The RRC in CU 715 exchanges S1-MME signaling and the NAS signaling with a Mobility Management Entity (MME) over network transceiver 728. The RRC in CU 715 processes the uplink RRC signaling and the downlink S1-MME signaling to generate new downlink RRC signaling and new uplink S1-MME signaling.

To establish a PCC and at least one SCC, the RRC in CU 715 processes the UE measurement report to identify F1-F4 and their Received Signal Strengths Indicators (RSSIs). The RRC selects the individual frequency bands F1-F4 that have RSSIs above a PCC strength threshold. The RRC also determines factors like MIMO layers, UE centrality angles, available sector proportions, and electrical down-tilt angles for the frequency bands F1-F4 that have adequate signal strength. The RRC applies normalizing factors to the factors (MIMO layers, UE centrality angles, available sector proportions, and electrical down-tilt angles) so each of the normalized factors has a value between 0-25 based on quality. The RRC sums the normalized factors into scores for each of F1-F4 that are between 0-100. The RRC selects the frequency band that has the best score for the PCC for UE 701.

The RRC in CU 715 and the DU that uses the selected frequency band exchange signaling to establish the PCC. The RRC in CU 715 and DUs 711-714 exchange additional signaling to establish the SCCs. For example, the RRC in CU 715 may select F1 for the PCC and exchange RRC signaling with a PDCP in DU 711 to establish a Long Term Evolution eNodeB that serves UE 701 with uplink/downlink data. The RRC in CU 715 may also select F2-F4 for the SCCs and exchange RRC signaling with the PDCPs in DUs 712-714 to establish Fifth Generation New Radio (5GNR) gNodeBs that serve UE 701 with downlink data. The PDCP in DU 711 then exchanges S1-U data with one or more Serving Gateways (S-GWs) over DU transceiver 724 and possibly CU 715. The PDCPs in DUs 712-714 receive S1-U data from one or more S-GWs. The PDCPs interwork between the S1-U data and RRC data. DU 711 wirelessly exchanges RRC data with UE 701. DUs 712-714 wirelessly transfer user data to UE 701.

In radio circuitry 721 of DU 711, the antennas receive wireless LTE signals from UE 701 that transport the Uplink (UL) RRC signaling and data. The antennas transfer corresponding electrical UL signals through duplexers to the amplifiers. The amplifiers boost the received UL signals for filters which attenuate unwanted energy. In modulation, demodulators down-convert the UL signals from their carrier frequency (F1). The analog/digital interfaces convert the analog UL signals into digital UL signals for the DSP. The DSP recovers UL LTE symbols from the UL digital signals. In DU 711 and CU 715, CPUs 723/726 execute the network applications to process the UL LTE symbols and recover the UL RRC signaling and data. In DU 711 and/or CU 715, CPUs 723/726 execute the network applications to generate new UL S1-MME signaling and UL S1-U data. In CU 715, network XCVR 728 transfers the new UL MME signaling to MMEs and the new UL 51-U data to the SGWs.

In CU 715, network XCVR 728 receives Downlink (DL) S1-MME signaling from the MMEs and DL S1-U data from the SGWs. In DU 711 and CU 715, CPUs 723/726 execute the network applications to generate corresponding DL RRC signaling and data. In DU 711 and CU 715, CPUs 723/726 execute the network applications to process the DL RRC signaling and data to generate DL LTE symbols that carry the DL RRC signaling and data. In DU 711, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency (F1). The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL RRC signaling and data to UE 701 over F1.

DUs 712-714 receive DL S1-U data from the SGWs. DUs 712-714 generate corresponding DL RRC data. DU 711-714 process the DL RRC data to generate DL 5GNR symbols that carry the DL RRC data. In the DUs, the DSPs process the DL 5GNR symbols to generate corresponding digital signals for the analog-to-digital interfaces. The analog-to-digital interfaces convert the digital DL signals into analog DL signals for modulation. Modulation up-converts the DL signals to their carrier frequencies (F2-F4). The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL RRC data to UE 701 over F2-F4.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 9:
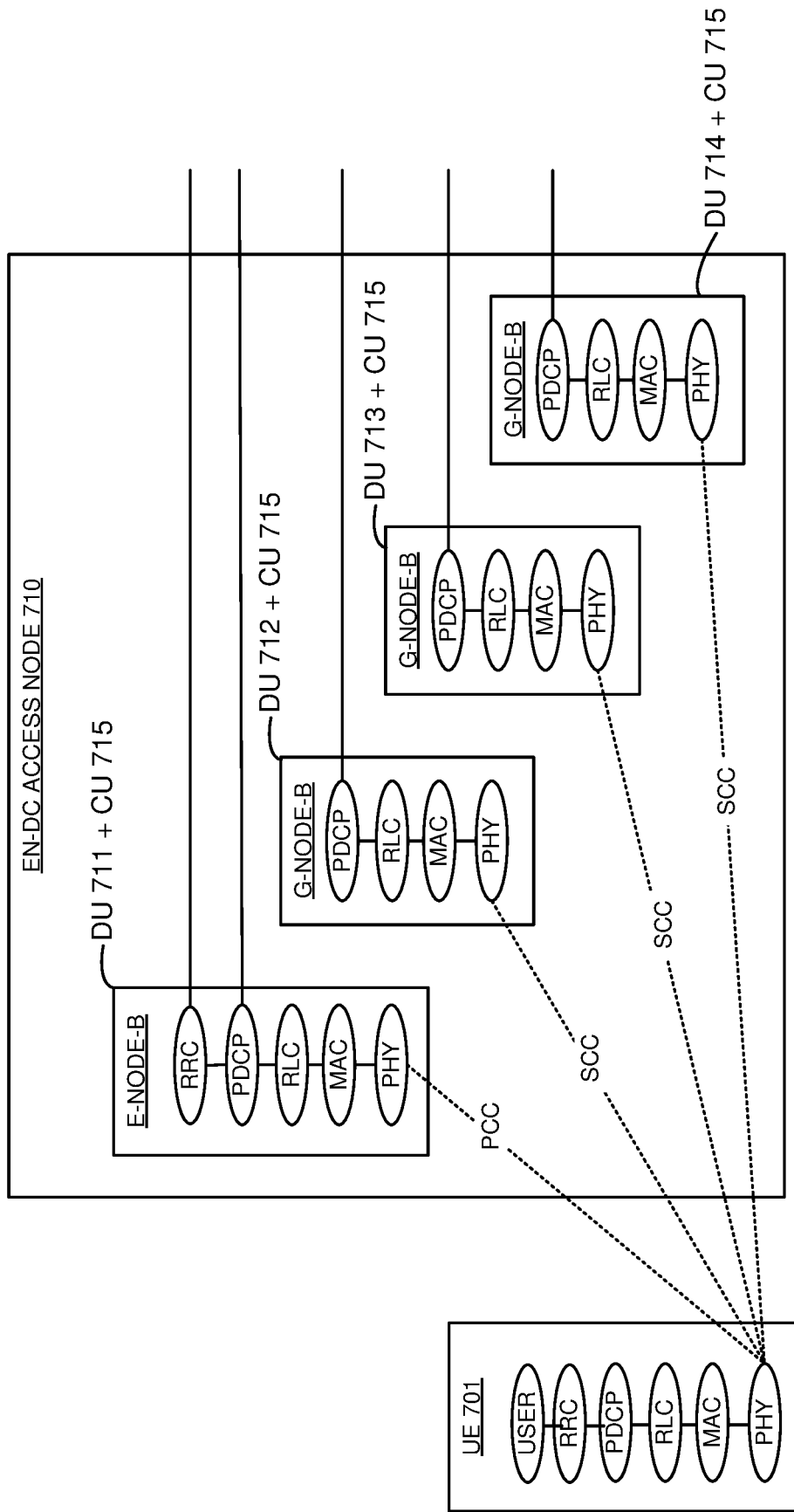
FIG. 9 illustrates the operation of the EN-DC access node to serve the wireless UEs over the PCCs and SCCs.

FIG. 9 illustrates the operation of EN-DC access node 710 to serve wireless UE 710 over a PCC and SCCs. In UE 701, the PHY scans for F1-F4 and reports the RSSIs to the RRC. The RRC in UE 701 transfers a measurement report indicating F1-F4 and the RSSIs to the RRC in the CU 715 (and the LTE eNodeB) over their respective PDCPs, RLCs, MACs, and PHYs. The RRC in CU 715 processes the measurement report to identify the individual frequency bands F1-F4 that have RSSIs above a threshold. The RRC determines factors like MIMO layers, UE centrality angles, available sector proportions, and electrical down-tilt angles for the individual frequency bands F1-F4 that have adequate signal strength. The RRC normalizes and sums the metrics into individual scores for F1-F4. The RRC selects one of F1-F4 that has the best score for the PCC for UE 701. The RRC also selects ones of F1-F4 for the SCCs for UE 701.

In this example, the RRC in CU 715 selects F1 for the PCC and selects F2-F4 for the SCCs. In response to the selections, the RRC in the eNodeB in CU 715 exchanges RRC signaling with the PDCP in DU 711 to extend the LTE eNodeB and serve UE 701 with UL/DL signaling and UL/DL data over their respective RLCs, MACs, and PHYs for the F1 PCC. The RRC in CU 715 also exchanges RRC signaling with the PDCPs in DUs 712-714 to extend the 5GNR gNodeBs and serve UE 701 with DL data for the F2-F4 SCCs. The PDCP in the eNodeB in DU 711 then exchanges S1-U data with the S-GWs. The PDCPs in the gNodeBs in DUs 712-714 receive S1-U data from the S-GWs. The PDCPs interwork between the S1-U data and RRC data. The PDCPs in DUs 712-714 transfer the RRC data to the PDCP in UE 701 over their respective RLCs, MACs, and PHYs for the F2-F4 SCCs. In UE 701, the PDCP exchanges the RRC data with the RRC which exchanges the corresponding user data with the user applications.

Figure 10:
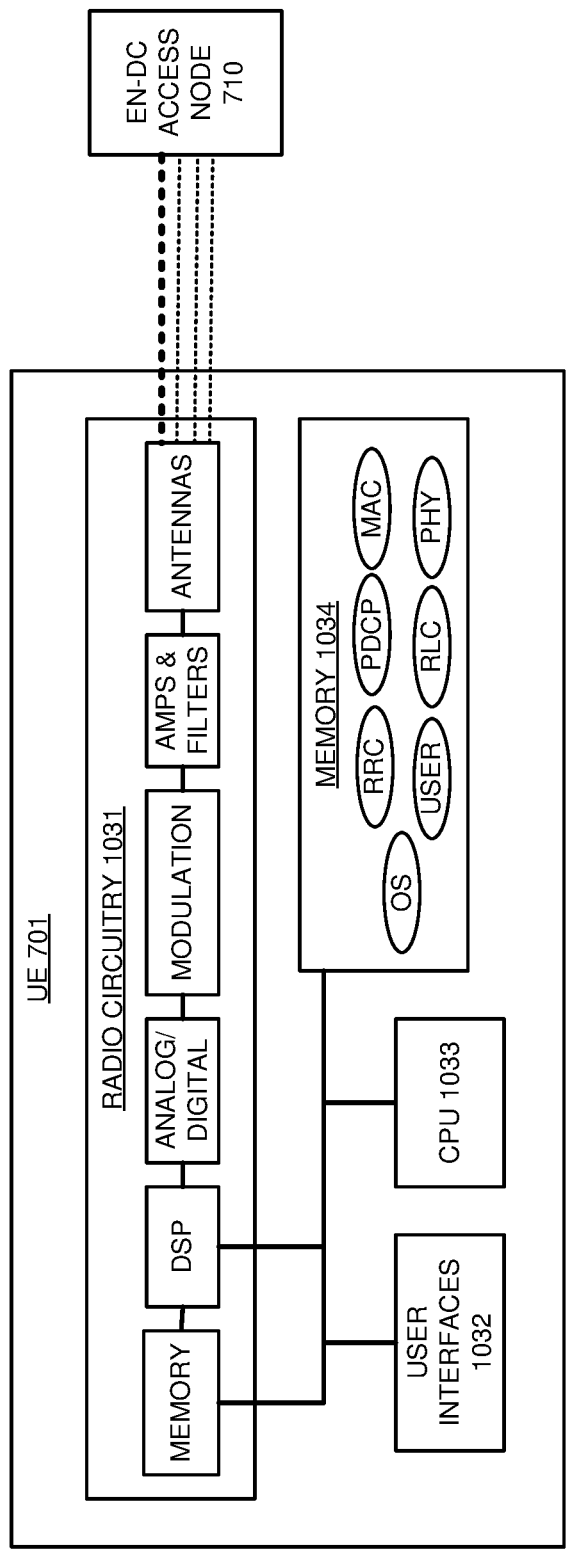
FIG. 10 illustrates the wireless UE that is served by the EN-DC access node over the PCCs and SCCs.

FIG. 10 illustrates wireless UE 701 that is served by EN-DC access node 710 over the PCC and SCCs. UE 701 is an example of UEs 101-103, although UEs 101-103 may differ. UE 701 comprises radio circuitry 1031, user interfaces 1032, CPU 1033, and memory 1034 which are interconnected over bus circuitry. Radio circuitry 1031 comprises antennas, amplifiers, filters, modulation, analog-to-digital interfaces, DSP, and memory that are coupled over bus circuitry. The antennas in UE 701 are coupled to EN-DC access node 710 over a PCC and SCCs that use F1-F4. User interfaces 1032 comprise graphic displays, machine controllers, sensors, cameras, transceivers, and/or some other user components. Memory 1034 stores an operating system, user applications, and network applications. The network applications comprise PHY, MAC, RLC, PDCP, and RRC. CPU 1033 executes the operating system, user applications, and network applications to exchange RRC signaling and data with EN-DC access node 710 over radio circuitry 1031.

The wireless data network circuitry described above comprises computer hardware and software that form special-purpose network circuitry to serve wireless UEs with PCCs and SCCs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs over PCCs and SCCs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to serve wireless User Equipment (UE) over radio frequency bands that comprise layers, the method comprising:
    radio circuitry wirelessly receiving information from the wireless UE that indicates received signal strengths for the radio frequency bands;
    the processing circuitry determining layer amounts for the radio frequency bands wherein the layers comprise parallel signals that share individual resource blocks in the radio frequency bands;
    the processing circuitry selecting one of the radio frequency bands that has an adequate one of the received signal strengths and a higher one of the layer amounts; and
    the radio circuitry wirelessly exchanging user data with the wireless UE over the selected one of the radio frequency bands to serve the wireless UE.

2. The method of claim 1 wherein the layers comprise Multiple Input Multiple Output (MIMO) layers.

3. The method of claim 1 wherein the radio circuitry wirelessly exchanging the user data with the wireless UE over the selected one of the radio frequency bands comprises wirelessly exchanging the user data in Fifth Generation New Radio (5GNR) signals.

4. The method of claim 1 wherein the radio circuitry wirelessly exchanging the user data with the wireless UE over the selected one of the radio frequency bands comprises wirelessly exchanging the user data in Long Term Evolution (LTE) signals.

5. The method of claim 1 wherein the radio circuitry wirelessly exchanging the user data with the wireless UE over the selected one of the radio frequency bands comprises wirelessly exchanging the user data in Low-Power Wide Area Network (LP-WAN) signals.

6. The method of claim 1 wherein the radio circuitry wirelessly exchanging the user data with the wireless UE over the selected one of the radio frequency bands comprises wirelessly exchanging the user data over a Primary Component Carrier (PCC).

7. The method of claim 1 wherein the processing circuitry determining the layer amounts and selecting the one of the radio frequency bands comprises a Centralized Unit (CU) determining the layer amounts and selecting the one of the radio frequency bands.

8. The method of claim 1 wherein the processing circuitry determining the layer amounts and selecting the one of the radio frequency bands comprises a Radio Resource Control (RRC) determining the layer amounts and selecting the one of the radio frequency bands.

9. The method of claim 1 wherein the processing circuitry determining the layer amounts and selecting the one of the radio frequency bands comprises an Evolved Universal Terrestrial Radio Access New Radio Dual Connectivity (EN-DC) node determining the layer amounts and selecting the one of the radio frequency bands.

10. The method of claim 1 wherein the wireless UE comprises a vehicle.

11. A wireless access node to serve wireless User Equipment (UE) over radio frequency bands that comprise layers, the wireless access node comprising:
    radio circuitry configured to wirelessly receive information from the wireless UE that indicates received signal strengths for the radio frequency bands;
    the processing circuitry configured to determine layer amounts for the radio frequency bands wherein the layers comprise parallel signals that share individual resource blocks in the radio frequency bands;
    the processing circuitry configured to select one of the radio frequency bands that has an adequate one of the received signal strengths and a higher one of the layer amounts; and
    the radio circuitry configured to wirelessly exchange user data with the wireless UE over the selected one of the radio frequency bands to serve the wireless UE.

12. The wireless access node of claim 11 wherein the layers comprise Multiple Input Multiple Output (MIMO) layers.

13. The wireless access node of claim 11 wherein the radio circuitry is configured to wirelessly exchange the user data in Fifth Generation New Radio (5GNR) signals to wirelessly exchange the user data with the wireless UE over the selected one of the radio frequency bands.

14. The wireless access node of claim 11 wherein the radio circuitry is configured to wirelessly exchange the user data in Long Term Evolution (LTE) signals to wirelessly exchanging the user data with the wireless UE over the selected one of the radio frequency bands.

15. The wireless access node of claim 11 wherein the radio circuitry is configured to wirelessly exchange the user data in Low-Power Wide Area Network (LP-WAN) signals to wirelessly exchange the user data with the wireless UE over the selected one of the radio frequency bands.

16. The wireless access node of claim 11 wherein the radio circuitry is configured to wirelessly exchange the user data over a Primary Component Carrier (PCC) to wirelessly exchange the user data with the wireless UE over the selected one of the radio frequency bands.

17. The wireless access node of claim 11 wherein the processing circuitry comprises a Centralized Unit (CU) configured to determine the layer amounts and select the one of the radio frequency bands.

18. The wireless access node of claim 11 wherein the processing circuitry comprises a Radio Resource Control (RRC) configured to determine the layer amounts and select the one of the radio frequency bands.

19. The wireless access node of claim 11 wherein the processing circuitry comprises an Evolved Universal Terrestrial Radio Access New Radio Dual Connectivity (EN- DC) node configured to determine the layer amounts and select the one of the radio frequency bands.

20. The wireless access node of claim 11 wherein the wireless UE comprises a vehicle.

\* \* \* \* \*